United States Patent
Yeh

(10) Patent No.: US 9,303,453 B2
(45) Date of Patent: Apr. 5, 2016

(54) POWER-FREE AUTOMATIC DRIVER STRUCTURE OF SUNSHADE

(71) Applicant: Chao-Hsien Yeh, Tainan (TW)

(72) Inventor: Chao-Hsien Yeh, Tainan (TW)

(*) Notice: Subject to any disclaimer, the term of this patent is extended or adjusted under 35 U.S.C. 154(b) by 0 days.

(21) Appl. No.: 14/339,467

(22) Filed: Jul. 24, 2014

(65) Prior Publication Data
US 2016/0024841 A1    Jan. 28, 2016

(51) Int. Cl.
| | | |
|---|---|---|
| *E06B 9/30* | (2006.01) | |
| *E06B 9/68* | (2006.01) | |
| *F16H 19/06* | (2006.01) | |
| *E06B 9/322* | (2006.01) | |
| *F03G 7/06* | (2006.01) | |
| *E06B 9/56* | (2006.01) | |
| *E06B 9/62* | (2006.01) | |
| *E05F 1/02* | (2006.01) | |
| *E06B 9/58* | (2006.01) | |

(52) U.S. Cl.
CPC . *E06B 9/68* (2013.01); *E06B 9/322* (2013.01); *F03G 7/065* (2013.01); *F16H 19/06* (2013.01); *E05F 1/02* (2013.01); *E06B 9/56* (2013.01); *E06B 9/62* (2013.01); *E06B 2009/3222* (2013.01); *E06B 2009/583* (2013.01)

(58) Field of Classification Search
CPC . F03G 7/065; E06B 9/322; E06B 2009/3222; E06B 9/56; E06B 2009/583; E06B 9/62; E05F 1/00; E05F 1/002; E05F 1/004; E05F 1/02
USPC ........ 160/1, 6, 9, 166.1, 168.1 R, 1 R, 172 R, 160/173 R, 178.1 R, 189, 190, 191, 192
See application file for complete search history.

(56) References Cited

U.S. PATENT DOCUMENTS

| | | | | | |
|---|---|---|---|---|---|
| 3,860,055 | A | * | 1/1975 | Wild | E06B 9/32 126/572 |
| 3,861,443 | A | * | 1/1975 | Tarnoff | A62C 2/16 160/1 |
| 3,981,343 | A | * | 9/1976 | DeVito | E05D 13/145 160/133 |
| 4,039,017 | A | * | 8/1977 | Tarnoff | E06B 9/0692 160/1 |
| 4,130,156 | A | * | 12/1978 | Wardlaw | A62C 2/247 160/9 |
| 4,567,549 | A | * | 1/1986 | Lemme | F03G 7/065 337/140 |
| 5,107,916 | A | * | 4/1992 | van Roermund | E06B 9/322 160/177 R |
| 5,159,967 | A | * | 11/1992 | Ashley | E06B 9/62 160/189 |

(Continued)

*Primary Examiner* — Katherine Mitchell
*Assistant Examiner* — Johnnie A Shablack
(74) *Attorney, Agent, or Firm* — Leong C. Lei

(57) ABSTRACT

A power-free automatic driver structure of a sunshade includes a transmission body, a shape-memory elastic body, a light condensation body, a driving body, and a rotary axle. The shape-memory elastic body is made of a material that undergoes deformation when heated to reach a predetermined level of temperature. The light condensation body condense and irradiates sunlight to the shape-memory elastic body to cause deformation thereof so as to have the shape-memory elastic body drive the transmission body and thus drive, via the driving body and the rotary axle, blind slat pull cords of the sunshade to move. When sunlight radiates and causes the shape-memory elastic body to reach the predetermined level of temperature, the shape-memory elastic body deforms and drives the transmission body, the driving body, and the rotary axle to operate so as to pull the blind slat pull cords of the sunshade upwards/downwards.

8 Claims, 10 Drawing Sheets

(56) References Cited

U.S. PATENT DOCUMENTS

| | | | | |
|---|---|---|---|---|
| 5,275,219 A * | 1/1994 | Giacomel | ............... | E06B 9/307 160/176.1 R |
| 5,338,089 A * | 8/1994 | Gotz | ........................ | B60J 7/223 160/373 |
| 5,816,306 A * | 10/1998 | Giacomel | ............... | E06B 9/368 160/176.1 P |
| 6,926,061 B2 * | 8/2005 | Schulte | ............... | E05D 13/1215 160/191 |
| 7,275,846 B2 * | 10/2007 | Browne | ............. | F21S 48/1778 362/467 |
| 7,878,230 B2 * | 2/2011 | Daus | ........................ | B66D 1/02 160/1 |
| 8,302,653 B2 * | 11/2012 | O'Hair | ..................... | E06B 9/307 160/115 |
| 8,656,714 B2 * | 2/2014 | Pinto, IV | ................. | F03G 7/065 160/6 |
| 8,821,224 B2 * | 9/2014 | Alexander | ............. | B60H 1/249 454/162 |
| 2006/0267376 A1 * | 11/2006 | McKnight | ............ | B60K 11/085 296/180.5 |
| 2008/0100092 A1 * | 5/2008 | Gao | ........................ | E05F 15/60 296/146.11 |
| 2015/0231427 A1 * | 8/2015 | Coopers | .................... | E06B 9/80 160/120 |

* cited by examiner

POWER-FREE AUTOMATIC DRIVER STRUCTURE OF SUNSHADE

TECHNICAL FIELD OF THE INVENTION

The present invention generally relates to a power-free automatic driver structure, and more particularly to a power-free automatic driver structure of a sunshade.

DESCRIPTION OF THE PRIOR ART

People often take activities indoors and some of the indoor activities do not need intense sunlight. People often install sunshades on windows of a building to block entry of sunlight into the building. Blocking sunlight into the building provides an effect of isolating heat and may regulate indoor temperature and lower down the indoor temperature and thus reduce the occasions of turning on air conditioners and lower down the expenditure of utility, so as to provide an efficacy of saving energy.

Electrical window curtains are available in the market, but the operations require consumption of electrical power, leading to wastes of energy and thus being not environment-friendly. A servomotor that provides a high power is generally expensive. Further, intelligent electrical window curtain control systems are also available, basically, from European and American manufacturers. Such systems can be installed generally with a cost around three to four hundred thousands of Taiwanese dollars. This discourages the general consumers.

Further, there are also window curtains that receive electrical power generated through conversion of sunlight as power for operation of the device and thus require no additional utility expense. However, these devices suffer complicated structures and high purchase costs.

Thus, heretofore, no ideal structures of automatic sunshades are available in the market. In light of the concept of saving energy for environmental protection, a structure that could automatically drive a sunshade without consuming electrical power and thus requiring no conversion of sunlight into electrical power would be of a significant effect for being totally power free, automatic, and environment friendly and reducing the manufacturing cost to encourage consumers' interest of purchasing.

In light of the above, the present invention aims to provide a solution that overcomes the above problems.

SUMMARY OF THE INVENTION

An object of the present invention is to provide a power-free automatic driver structure of a sunshade in which when a shape-memory elastic body reaches a predetermined temperature resulting from sunlight radiation, the shape-memory elastic body is caused to deform and drive a collaborative mechanism to pull a blind slat pull cord upward and/or downward thereby constituting a power-free automatic sunshade driver structure that automatically changes angular positions of blind slats.

To achieve the above object, the present invention comprises a transmission body, a shape-memory elastic body, a light condensation body, a driving body, and a rotary axle, wherein the shape-memory elastic body has an end connected to an end of the transmission body and the shape-memory elastic body is made of a material that undergoes deformation when heated to reach a predetermined level of temperature; the light condensation body is made of a light condensing material and the light condensation body is arranged at a location corresponding to the shape-memory elastic body; the driving body has an end connected to an opposite end of the transmission body; and the rotary axle is in operative coupling with the driving body and the rotary axle is operatively coupled to blind slat pull cords of the sunshade.

When sunlight radiates and causes the shape-memory elastic body to reach a predetermined level of temperature, the shape-memory elastic body undergoes deformation to drive the transmission body, the driving body, and the rotary axle to operate so as to pull the blind slat pull cords of the sunshade upwards/downwards thereby achieving an operation of automatic change of an angular position of the blind slats of the sunshade (for example to open or close the blind slats), and thus achieving the advantages of being free of power, self-acting, environment friendly, temperature regulating, and having low manufacturing costs.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
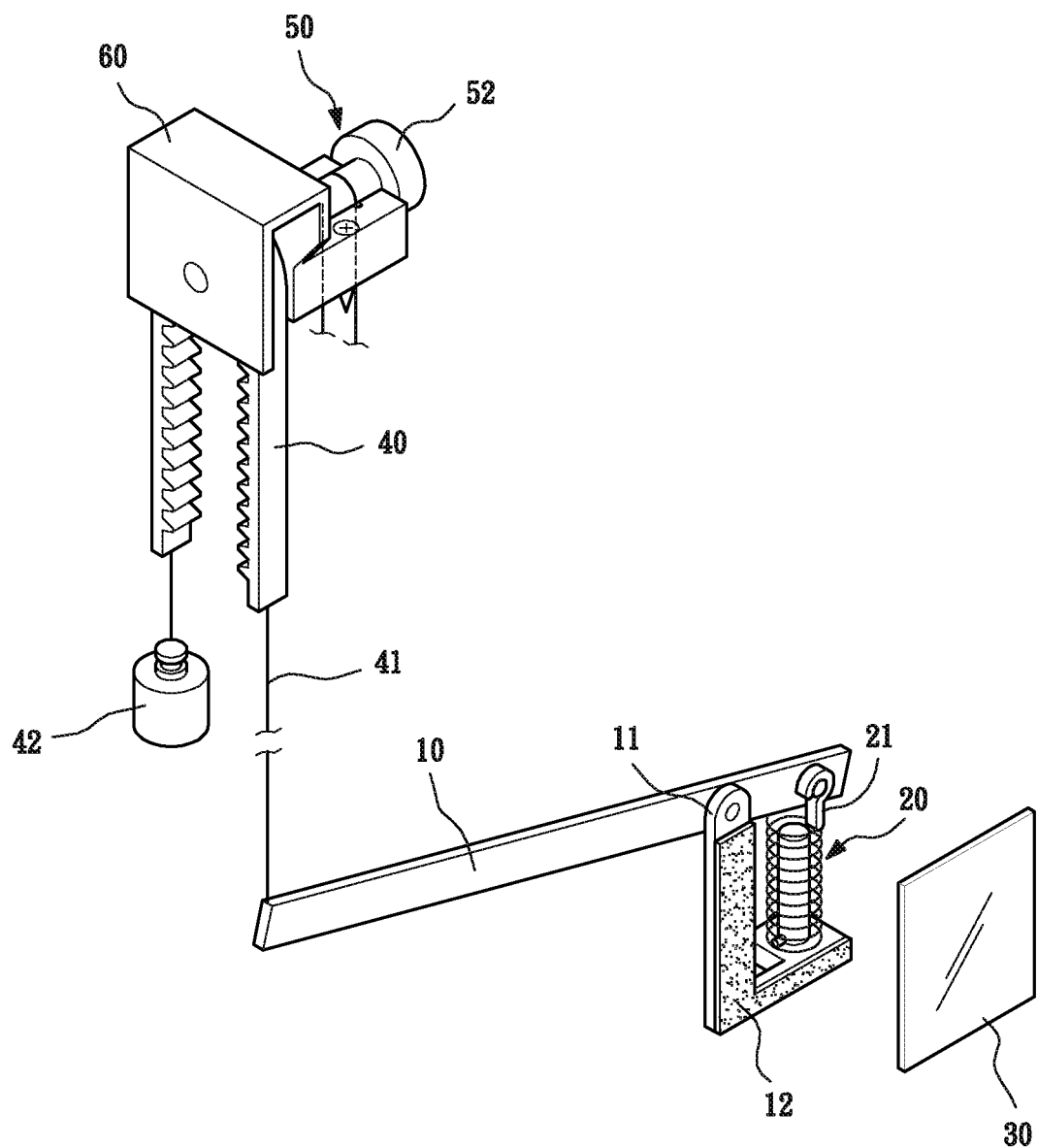
FIG. 1 is a perspective view of the present invention.
Figure 2:
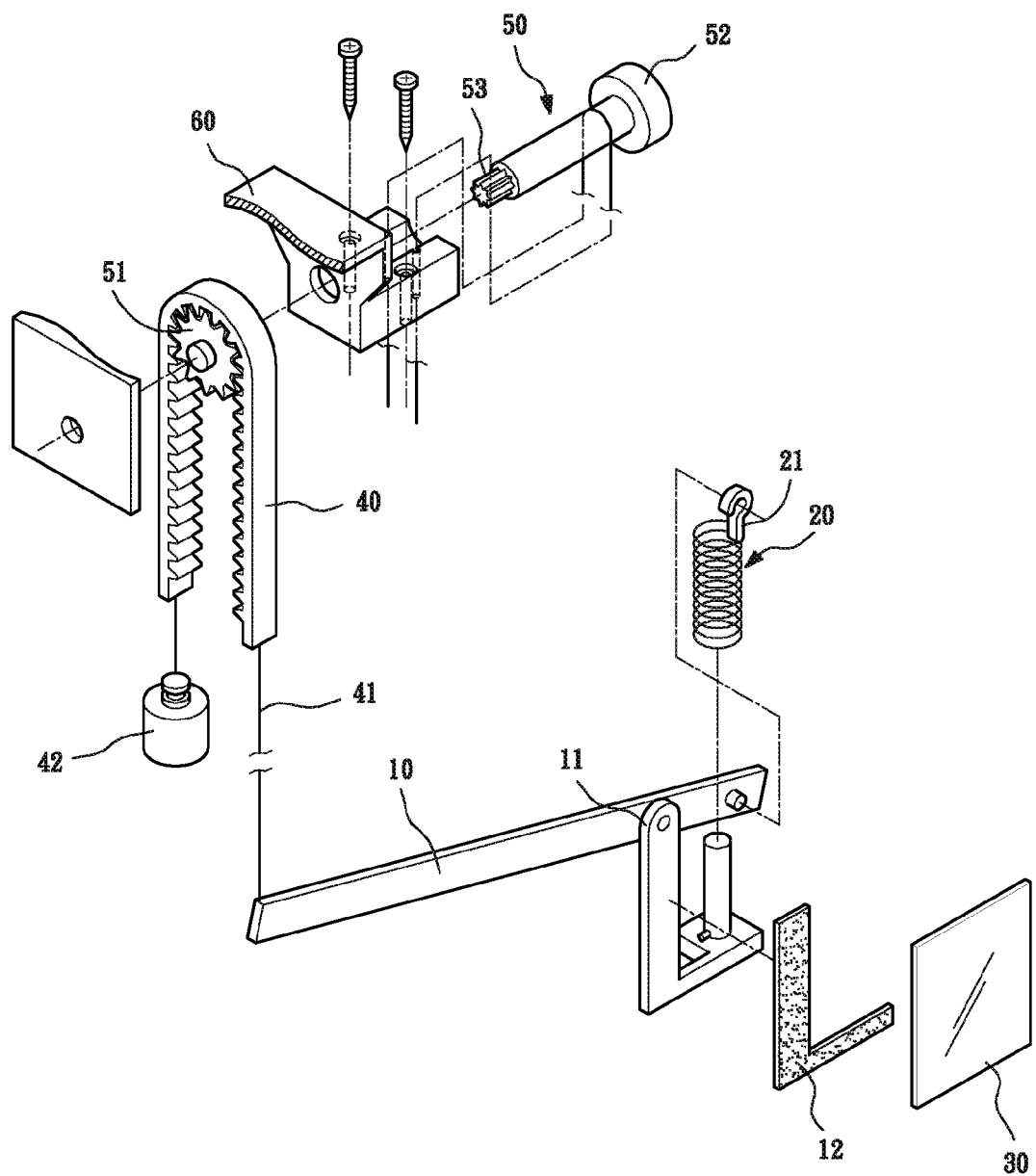
FIG. 2 is an exploded view of the present invention.
Figure 3:
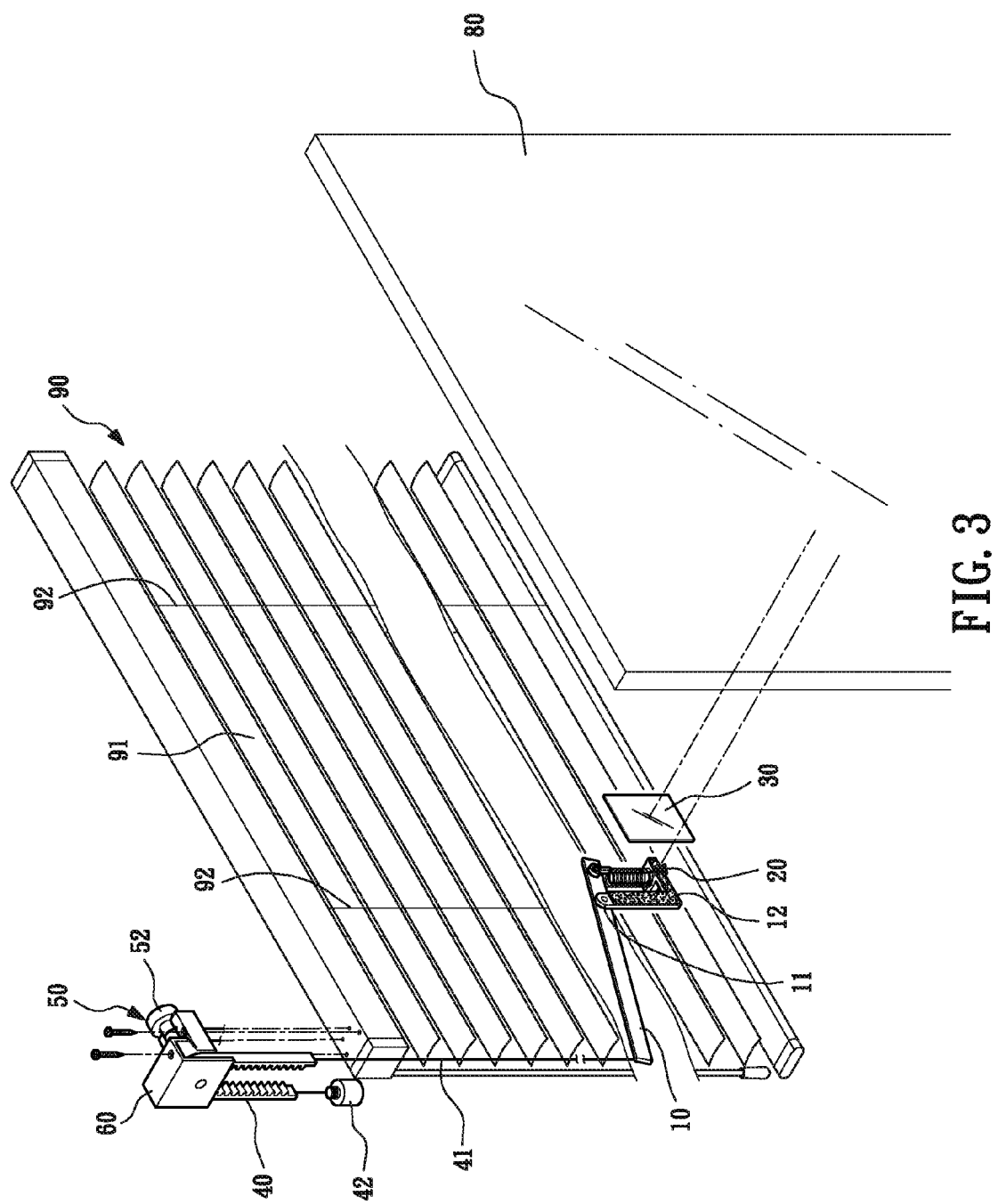
FIG. 3 is a schematic view illustrating installation of the present invention.
Figure 4:
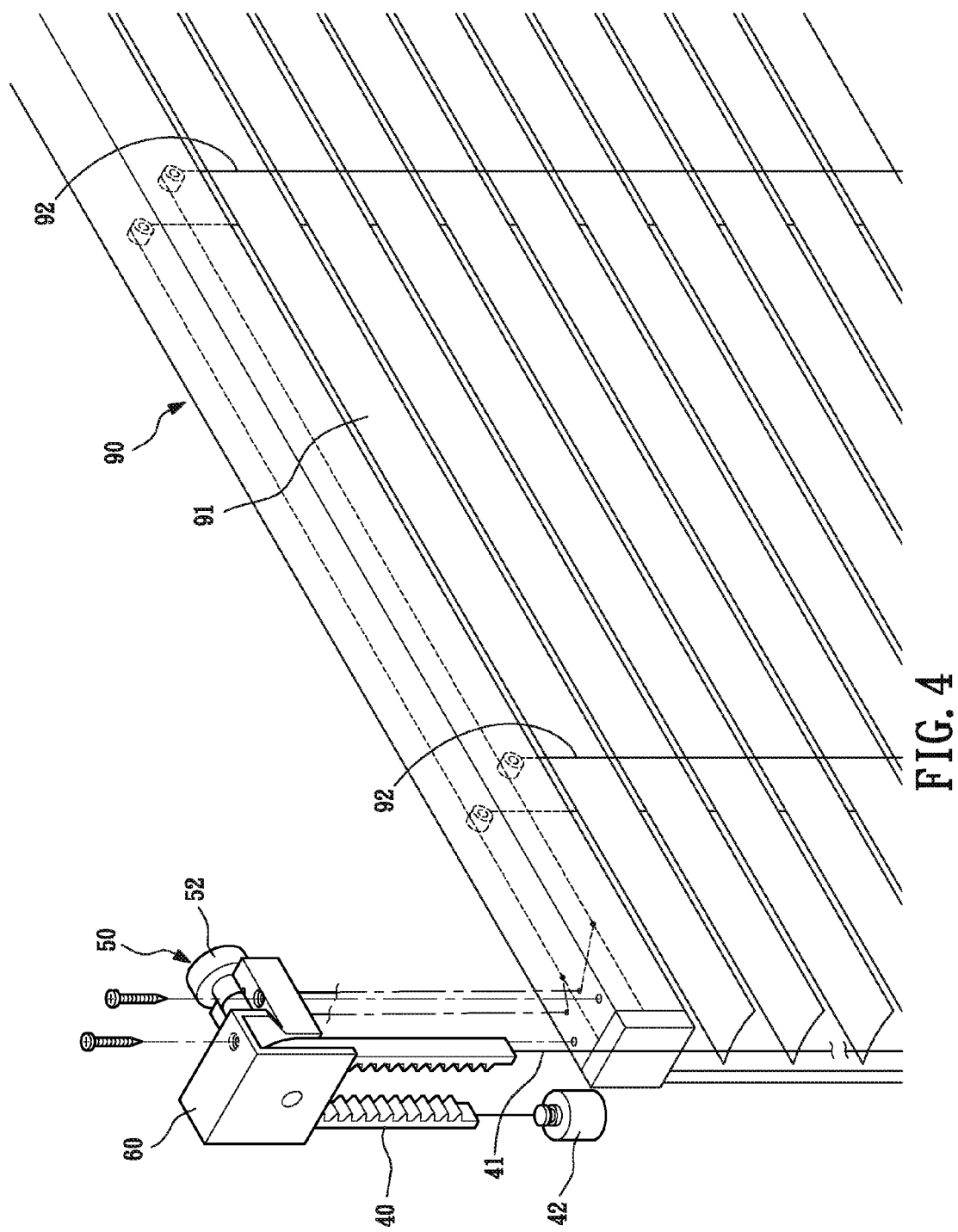
FIG. 4 is an enlarged view of a portion of FIG. 3.
Figure 5:
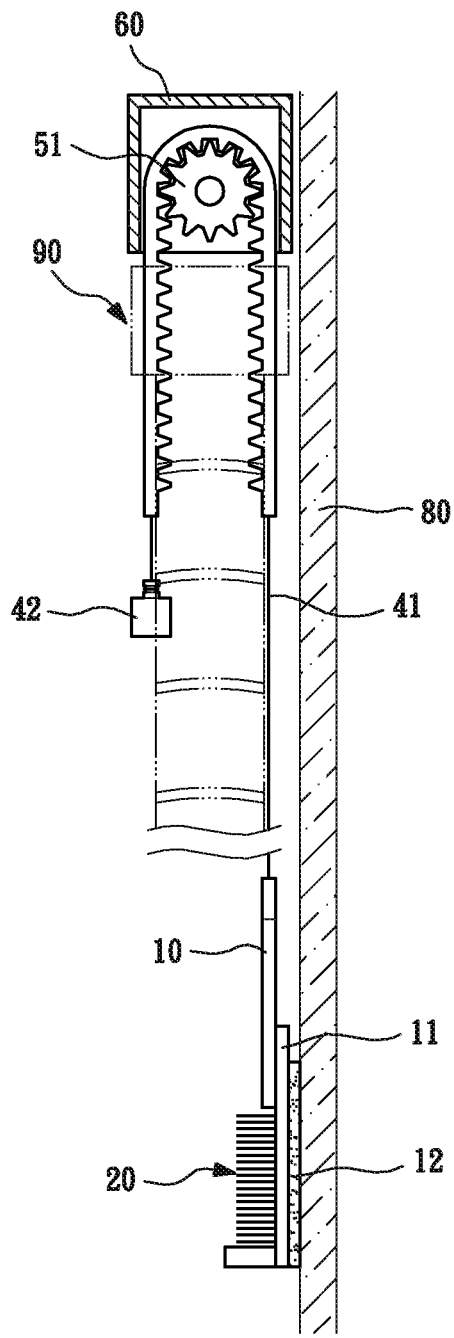
FIG. 5 is a cross-sectional view of the present invention.
Figure 6:
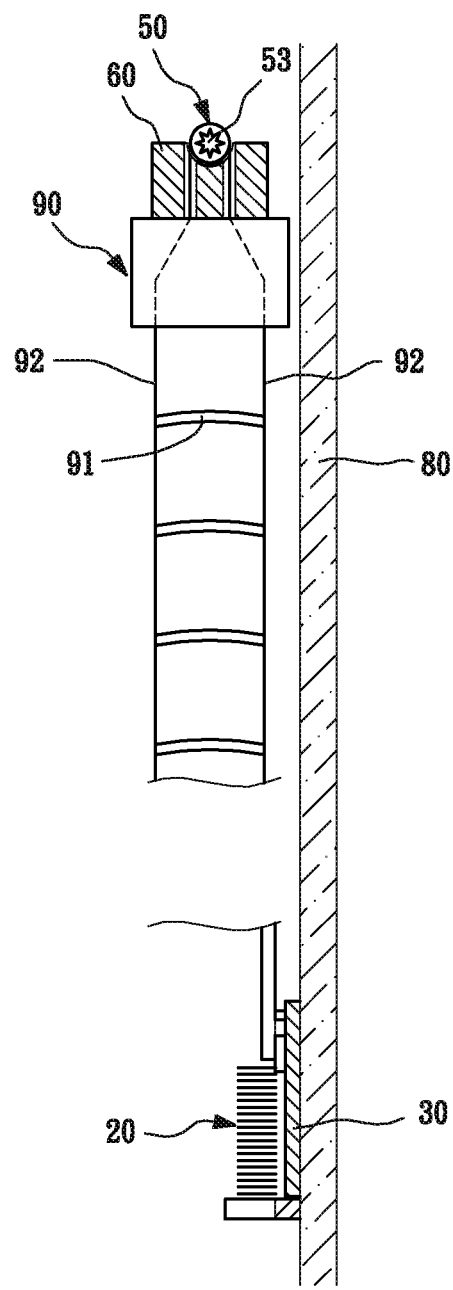
FIG. 6 is another cross-sectional view of the present invention.
Figure 7:
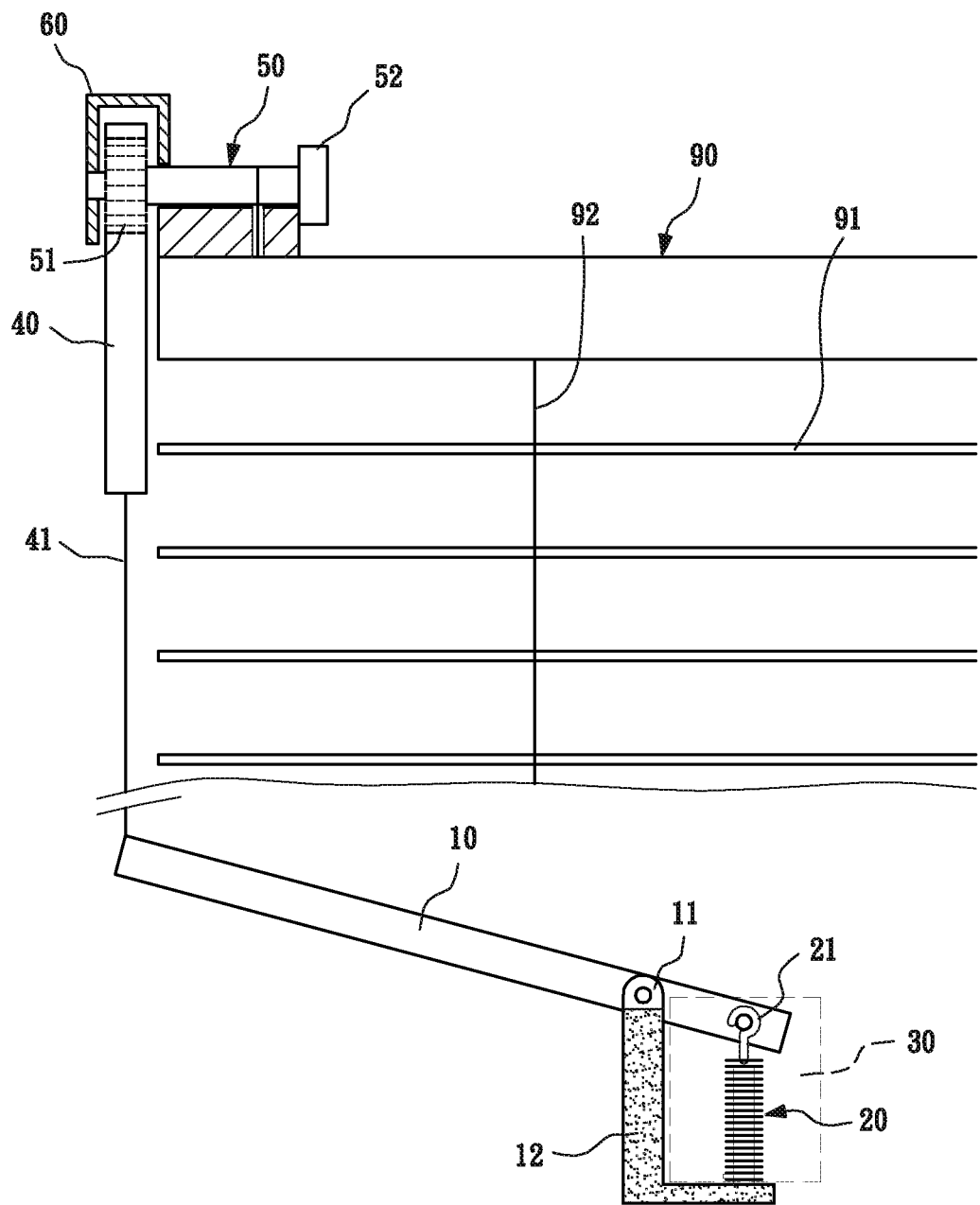
FIG. 7 is a front view of the present invention.
Figure 8:
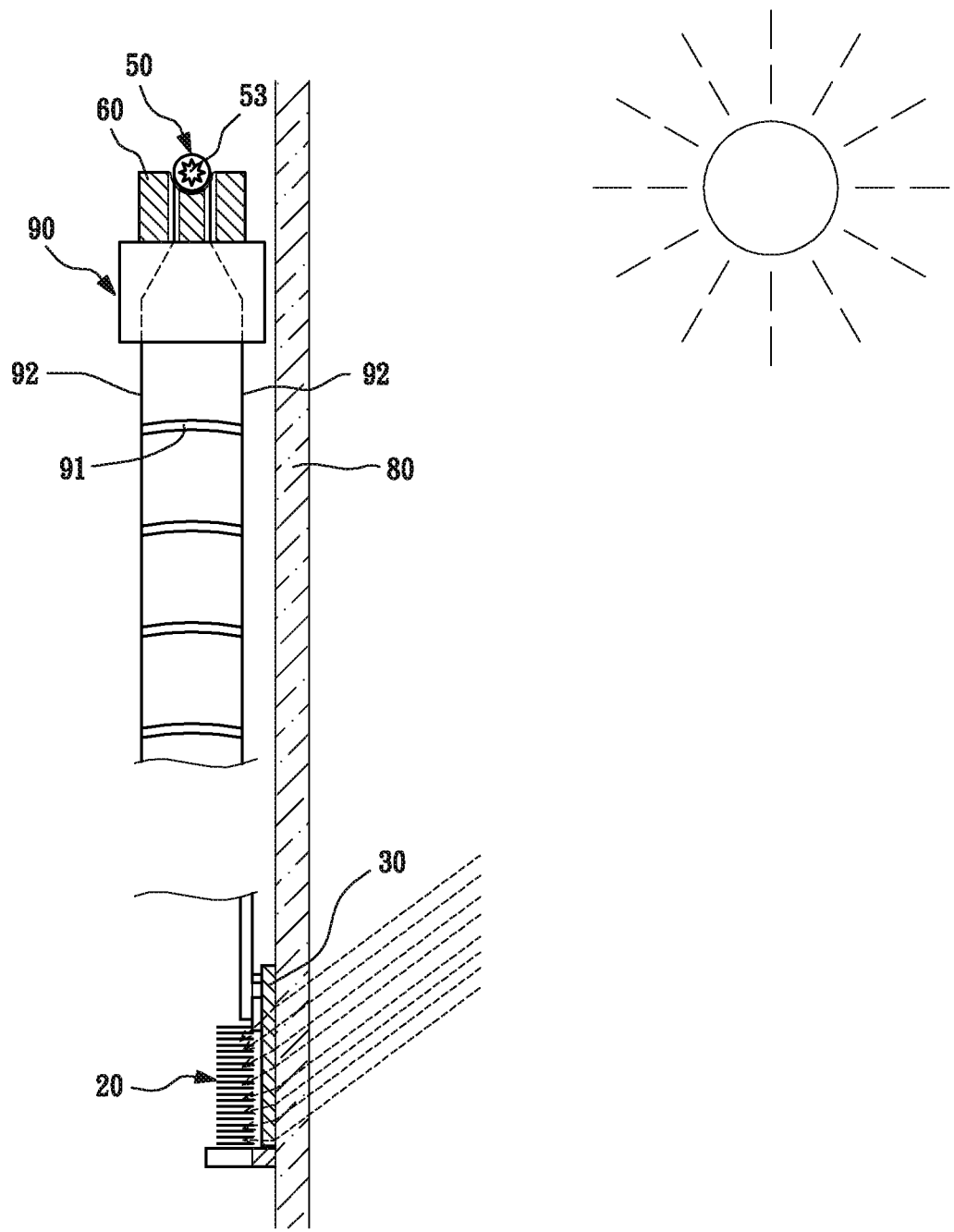
FIG. 8 is a schematic view illustrating the operation of the present invention.
Figure 9:
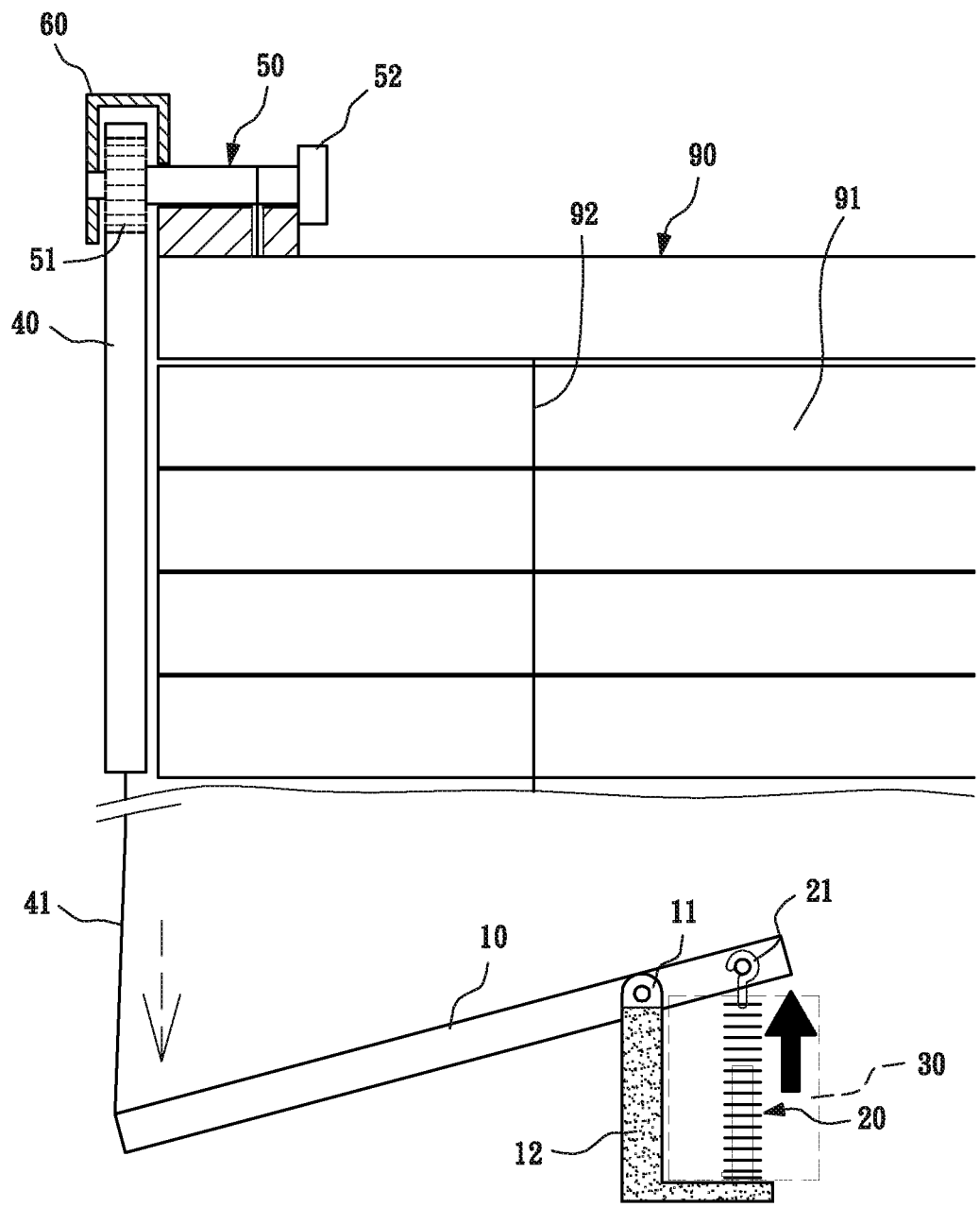
FIG. 9 is another schematic view illustrating the operation of the present invention.
Figure 10:
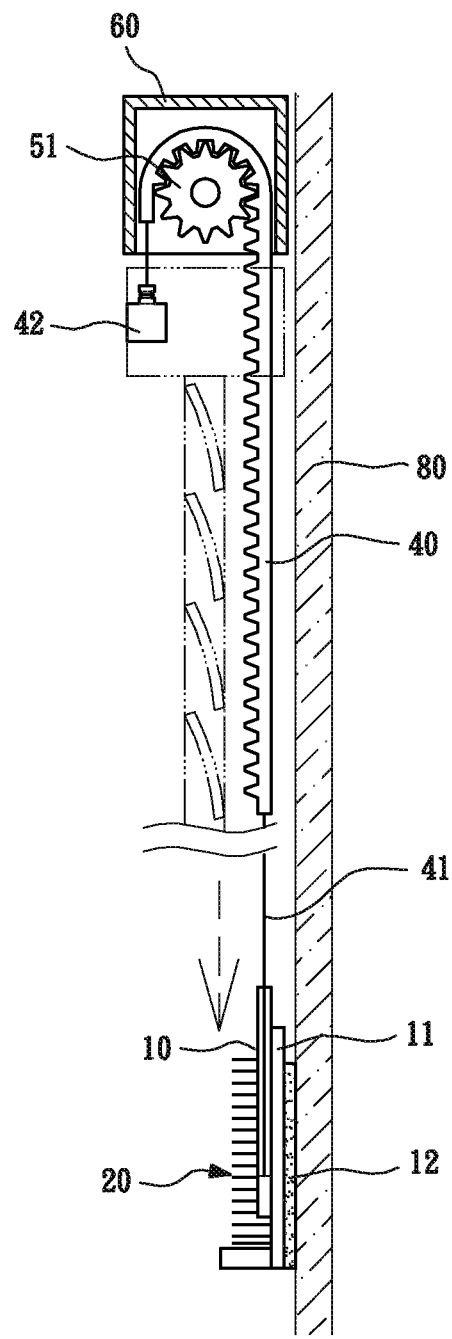
FIG. 10 is a further schematic view illustrating the operation of the present invention.
Figure 11:
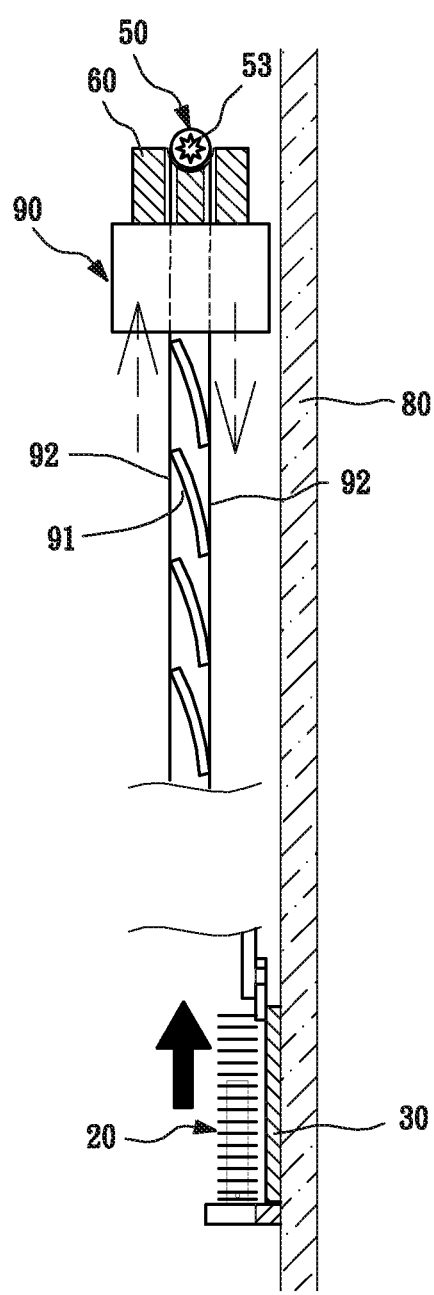
FIG. 11 is a further view illustrating the operation of the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-7, the present invention is applicable to a sunshade 90. The sunshade 90 comprises a plurality of blind slats 91 and two blind slat pull cords 92 that are coupled to the blind slats 91 and are operable to pull the blind slats 91 upwards and/or downward to cause a change of an angular position thereof (for example opening and/or closing the blind slats). The sunshade 90 is of a known structure and further description will be omitted herein. A preferred embodiment of the present invention comprises a transmission body 10, a shape-memory elastic body 20, a light condensation body 30, a driving body 40, and a rotary axle 50, of which details will be discussed hereinafter.

The transmission body 10 is made in the form of a connection bar and the transmission body 10 is pivotally connected to a support stand 11 and is thus oscillatable. The support stand 11 is coupled to a mounting piece 12 and is thus mounted, via the mounting piece 12, to a window glass panel 80 of a building. The mounting piece 12 can be a double-sized adhesive member.

The shape-memory elastic body 20 has an end coupled to an end of the transmission body 10. The shape-memory elastic body 20 is made of a material that undergoes deformation when heated to a predetermined temperature. The shape-memory elastic body 20 can be a shape-memory metallic spring. The shape-memory elastic body 20 has an end forming a hook 21, which hooks and is thus attached to an end of the transmission body 10.

The light condensation body 30 is made of light condensing material. The light condensation body 30 is arranged at a location corresponding to the shape-memory elastic body 20. The light condensation body 30 can be attached to the window glass panel 80 of the building.

The driving body 40 has an end connected to an opposite end of the transmission body 10. The driving body 40 is a U-shaped toothed strip. The end of the driving body 40 is connected by a flexible body 41, such as a rope, to the opposite end of the transmission body 10. The driving body 40 has an opposite end that is connected to a weight unit 42, which applies a gravity force to assist the driving force that moves the driving body 40 upwards and/or downwards.

The rotary axle 50 is operatively coupled to the driving body 40 and the rotary axle 50 is also operatively coupled to the blind slat pull cords 92 of the sunshade 90. The rotary axle 50 comprises a driving wheel 51. The driving wheel 51 is a toothed wheel and the driving wheel 51 engages the driving body 40. The rotary axle 50 comprises an axle body 52. The axle body 52 has an end on which a protrusion 53 is formed. The protrusion 53 is fit to and coupled with the driving wheel 51 so as to allow the axle body 52 and the driving wheel 51 to be detachably connected to each other thereby constituting a separable arrangement of driving force for controlling activation/de-activation of automatic driving of the blind slat pull cords 92. The rotary axle 50 further comprises a retention seat 60 in order to be mounted, via the retention seat 60, to the sunshade 90.

Referring to FIGS. 8-11, when sunlight irradiates the window glass panel 80 of the building, the light condensation body 30 of the present invention condenses sunlight to irradiate the shape-memory elastic body 20, whereby when the shape-memory elastic body 20 reaches a predetermined level of rising temperature, the shape-memory elastic body 20 undergoes deformation and extends upward with the rising of the temperature so that the opposite end of the transmission body 10 is caused to move downward and pulls the driving body 40 downward to have the driving body 40 drive the rotary axle 50 to rotate. The rotation of the rotary axle 50 pulls the blind slat pull cords 92 of the sunshade 90 upwards/ downwards so that an automatic change of the angular position of the blind slats 91 of the sunshade 90 can be achieved to for example close the blind slats 91 and block sunlight entering the building, thereby achieving an effect of heat isolation for automatically regulating indoor temperature and helping reduce indoor temperature and providing advantages of being free of power, self-acting, environment friendly, temperature regulating, and having low manufacturing cost.

Oppositely, when the sunlight gets less intense and the temperature of the shape-memory elastic body 20 drops, the shape-memory elastic body 20 resumes the original shape with the drop of the temperature thereby achieving an operation of automatic opening of the blind slats 91 of the sunshade 90.

Figure 12:
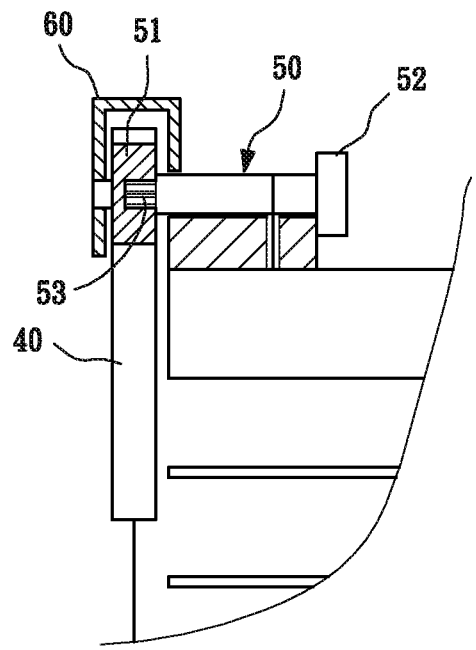
FIG. 12 is a schematic view illustrating separation of driving power of the present invention.
Figure 13:
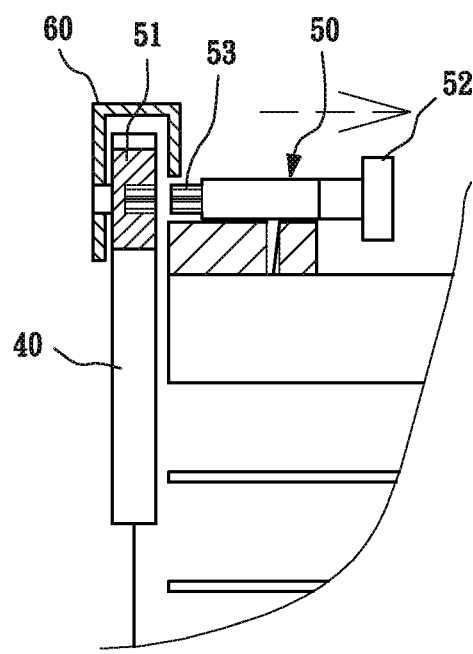
FIG. 13 is another schematic view illustrating the separation of the driving power of the present invention.

Referring to FIGS. 12 and 13, in an example of use and operation of the present invention, when the axle body 52 of the rotary axle 50 is moved in a direction away from the driving wheel 51, the protrusion 53 is caused to disengage from the driving wheel 51 thereby achieving separation of the driving force. As such, the rotary axle 50 is prohibited from driving the blind slat pull cords 92 of the sunshade 90 and a user may manually operate and control the blind slat pull cords 92 of the sunshade 90. Thus, the present invention is applicable to a regular sunshade without modifying the structure and mechanism of the sunshade, making it widely applicable.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A non-electric and non-battery powered automatic driver structure of a sunshade, comprising:
    a transmission body;
    a shape-memory elastic body, which has an end coupled to an end of the transmission body, the shape-memory elastic body being made of a material that undergoes deformation when heated to reach a predetermined level of temperature;
    a light condensation body, which is made of a light concentrating material, the light condensation body being arranged at a location corresponding to the shape-memory elastic body;
    a driving body, which has an end coupled to an opposite end of the transmission body; and
    a rotary axle, which is in operative coupling with the driving body, the rotary axle being operatively coupled to blind slat pull cords of the sunshade;
    wherein the transmission body is pivotally connected to a support stand and is oscillatable.

2. The non-electric and non-battery powered automatic driver structure of the sunshade according to claim 1, wherein the shape-memory elastic body comprises a shape-memory metallic spring.

3. The non-electric and non-battery powered automatic driver structure of the sunshade according to claim 1, wherein the driving body comprises a toothed strip, the rotary axle comprising a driving wheel, the driving wheel being a toothed wheel, the driving wheel being set in engagement with the driving body, the rotary axle comprising an axle body, the axle body having an end forming a protrusion, the protrusion being fit to and detachably attached to the driving wheel so as to achieve selective separation of the axle body and the driving wheel from each other.

4. The non-electric and non-battery powered automatic driver structure of the sunshade according to claim 1, wherein the end of the driving body is connected by a flexible body to the opposite end of the transmission body.

5. The non-electric and non-battery powered automatic driver structure of the sunshade according to claim 1, wherein the driving body has an end connected to a weight unit, which makes use of gravity force to assist a driving force that moves the driving body.

6. The non-electric and non-battery powered automatic driver structure of the sunshade according to claim 1, wherein the rotary axle is mounted to a retention seat, via the retention seat, to the sunshade.

7. The non-electric and non-battery powered automatic driver structure of the sunshade according to claim 1, wherein a support stand is coupled to a mounting piece, via the mounting piece, to a window glass panel of a building.

8. The non-electric and non-battery powered automatic driver structure of the sunshade according to claim 7, wherein the mounting piece comprises a double-sided adhesive member.

* * * * *